United States Patent [19]
Otake et al.

[11] Patent Number: 5,829,193
[45] Date of Patent: Nov. 3, 1998

[54] MOQUETTE FOR A HORTICULTURAL HANGING POT

[75] Inventors: Yoshisada Otake, Saitama, Japan; Philippe Ouaki, Paris, France

[73] Assignee: Combi Corporation, Tokyo, Japan

[21] Appl. No.: 865,893

[22] Filed: May 30, 1997

[30] Foreign Application Priority Data

Jun. 3, 1996 [JP] Japan .................................. 8-140358

[51] Int. Cl.$^6$ ...................................................... A01G 9/02
[52] U.S. Cl. ............................................ 47/65.8; 604/372
[58] Field of Search ................................ 47/65.8, 66.1–6, 47/72, 76, 59; 604/368, 378, 379

[56] References Cited

U.S. PATENT DOCUMENTS

| | | | |
|---|---|---|---|
| 4,573,988 | 3/1986 | Pieniak et al. | 604/379 |
| 5,309,673 | 5/1994 | Stöver et al. | 47/65.8 X |
| 5,454,191 | 10/1995 | Mayeda et al. | 47/65.8 |
| 5,505,719 | 4/1996 | Cohen et al. | 604/372 |

*Primary Examiner*—Michael J. Carone
*Assistant Examiner*—Robert Pezzuto
*Attorney, Agent, or Firm*—Sughrue, Mion, Zinn, Macpeak & Seas, PLLC

[57] ABSTRACT

A moquette for a horticultural hanging pot, in which the water retention is improved conspicuously. A super absorbent polymer powder layer and a peat moss powder layer and/or a porous plastic film are interposed between a hemp cloth layer (inner wall material) and a jute layer (outer wall material) in the form of a sandwich.

3 Claims, 2 Drawing Sheets

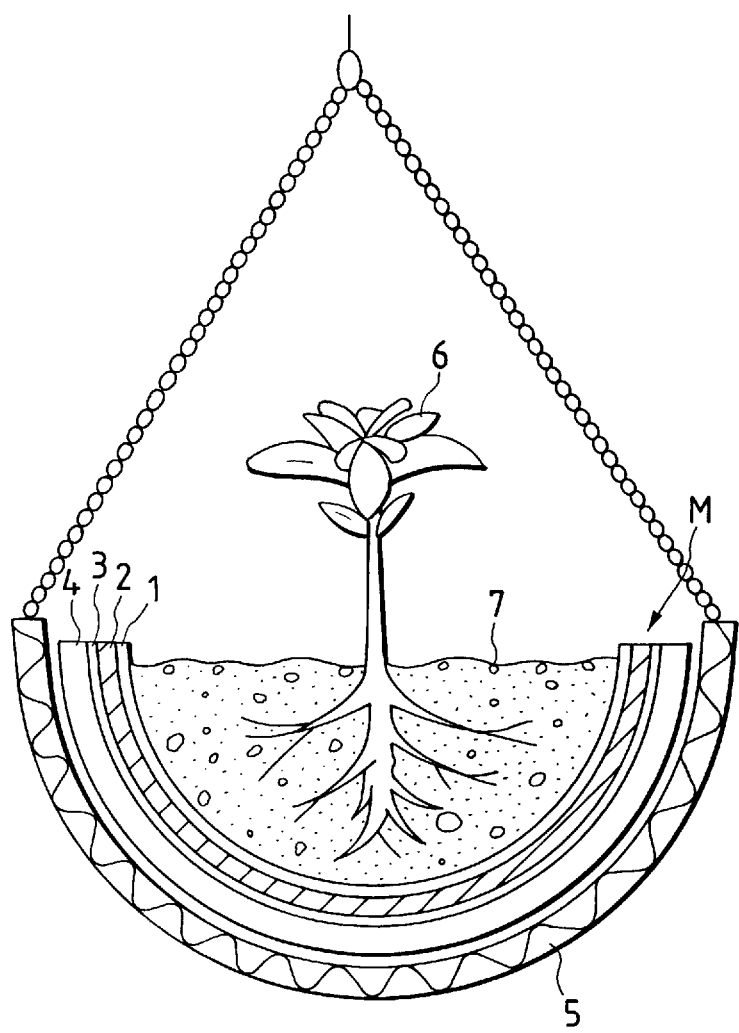

MOQUETTE FOR A HORTICULTURAL HANGING POT

BACKGROUND OF THE INVENTION

1. Field of the Invention

The present invention relates to moquette to be laid in the inside of a horticultural hanging pot. The "hanging pot" herein means a so-called hanging basket, including a wall-mounted pot.

2. Related art

Conventionally, a horticultural hanging pot is constituted by an outer wall material such as iron, plastic, wood, ceramics or the like, and an inner wall material such as sphagnum, coconut fiber, urethane or the like. When the hanging pot is used, soil, sphagnum and so on are further put into the inside thereof.

In such a conventional pot, although it is possible to plant from its side, the outer wall material or the inner wall material constituting the moquette cannot be expected to have the water-holding property because the water-holding property thereof depends on the water-holding quantity of the soil, sphagnum and so on. Accordingly, there has been a disadvantage in that the water retention is poor if the air permeability is regarded as important, while the air permeability is lost if the water retention is given preference. That is, because the water retention is poor so that only a fixed amount of water is retained, the pot is apt to dry out very quickly even if the pot is watered. In addition, watering is performed outdoors, and the pot cannot be taken into the room before the water stops dripping from the pot. Therefore, there has been a problem in that watering itself takes a great deal of time.

SUMMARY OF THE INVENTION

It is an object of the present invention to provide a moquette for a horticultural hanging pot in which the water retention is improved conspicuously while the air permeability is kept high.

As the result of diligent investigation to attain the foregoing object, the present inventor found that a moquette for a horticultural hanging pot that is improved in the water retention can be obtained by interposing powder of super absorbent polymers between layers of the moquette, and accomplished the present invention.

That is, the first moquette for a horticultural hanging pot according to the present invention, is characterized in that a super-absorbent-polymer-powder layer and a peat-moss-powder layer are interposed between an inner wall material constituted by a hemp cloth layer and an outer wall material constituted by a jute layer.

Further, the second moquette for a horticultural hanging pot according to the present invention, is characterized in that a super-absorbent-polymer-powder layer and a porous plastic film are interposed between an inner wall material constituted by a hemp cloth layer and an outer wall material constituted by a jute layer.

Further, the third moquette for a horticultural hanging pot according to the present invention, is characterized in that a super-absorbent-polymer-powder layer, a peat-moss-powder layer and a porous plastic film are interposed between an inner wall material constituted by a hemp cloth layer and an outer wall material constituted by a jute layer.

The materials forming the layers of the first, second and third moquette for a horticultural hanging pot according to the present invention will be described below in detail.

Hemp cloth constituting the inner wall material of the moquette, which is a natural material, is rich in air permeability, easily compatible with the roots of plants, and has an effect to make it easy for roots to enter. In addition, jute constituting the outer wall material is hemp fiber compressed in the form of felt, which is a natural material and rich in air permeability in the same manner as the hemp cloth. Both of the hemp cloth layer (inner wall material) and the jute layer (outer wall material) in the present invention have air permeability and a function as a support, so that super absorbent polymer powder and peat moss powder can be prevented from falling down or being lost.

A super absorbent polymer which is a material contributing extremely to the water retention of the moquette is a high polymer having a property to absorb water in a short time when the polymer contacts with liquid water. The polymer can hold water several hundred times as much as its own weight. Absorbing water, the polymer swells and becomes hydrogel so as to have a half-permeable wall, so that water is absorbed while only a little of the absorbed water is released. Therefore, the polymer has an effect to block water leakage, and the water held in the gel contributes to the growth of plants.

Specific examples of such a super absorbent polymer include hydrolysates of starch-acrylonitrile copolymers, cross-linkable polyvinyl alcohol, polyacrylic acid and its copolymers, and polymers such as carboxymethyl cellulose. Polyter (sodium polyacrylate, made by P.O.D.G. Co., France) is especially preferred as the super absorbent polymer, and this super absorbent polymer may be in the form of powder, granule, or film as a whole.

The peat moss used in the moquette according to the present invention means, in the narrow sense, grass carbonized in the lower level, that is, so-called grass charcoal, but herein means peat, humus, etc. as well as grass charcoal. The peat moss layer has water retention and air permeability, and is characterized in that water retention appears quickly.

In a plastic film used in the moquette according to the present invention, a large number of small holes are provided in order to improve the air permeability. Such a porous plastic film has not only air permeability but also functions as a support, so that super absorbent polymer powder and peat moss powder can be prevented from being lost. Specific examples of the porous plastic film include porous films such as polyethylene, polyester, polyvinyl chloride, polyamide (nylon, etc.), polyvinyl alcohol, or the like.

The moquette according to the present invention is laid in a hanging pot, so that the hemp cloth layer as the inner wall material contacts with soil, and the jute layer as the outer wall material contacts with the inner surface of the hanging pot.

BRIEF DESCRIPTION OF THE DRAWINGS

FIG. 4 is a sectional view illustrating the state where the moquette according to the present invention is used for a horticultural hanging pot.

DETAILED DESCRIPTION OF THE PREFERRED EMBODIMENTS

First embodiment

Figure 1:
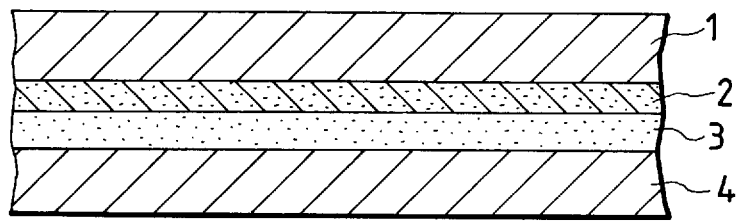
FIG. 1 is a sectional view illustrating a first embodiment of moquette according to the present invention.

FIG. 1 is a sectional view illustrating a first embodiment of a moquette according to the present invention, in which the moquette has a structure in that a super-absorbent-polymer powder layer 2 and a peat-moss-powder layer 3 are interposed between a hemp cloth layer (inner wall material) 1 and a jute layer (outer wall material) 4. In this embodiment, the super-absorbent-polymer-powder layer 2 is provided inside so as to contact with the hemp cloth layer 1, and the peat-moss-powder layer 3 is provided outside so as to contact with the jute layer 4.

Second embodiment

Figure 2:
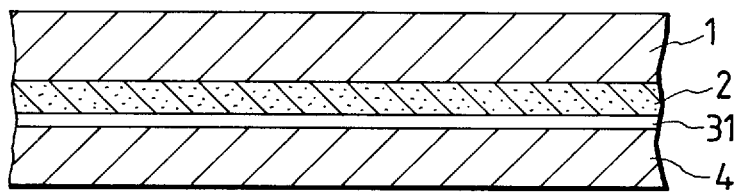
FIG. 2 is a sectional view illustrating a second embodiment of moquette according to the present invention.

FIG. 2 is a sectional view illustrating a second embodiment of the moquette according to the present invention, in which the moquette has a structure in that a super-absorbent-polymer-powder layer 2 and a porous plastic film layer 31 are interposed between a hemp cloth layer (inner wall material) 1 and a jute layer (outer wall material) 4. In this embodiment, the super-absorbent-polymer-powder layer 2 is provided inside so as to contact with the hemp cloth layer 1, and the porous plastic film layer 31 is provided outside so as to contact with the jute layer 4.

Third Embodiment

Figure 3:
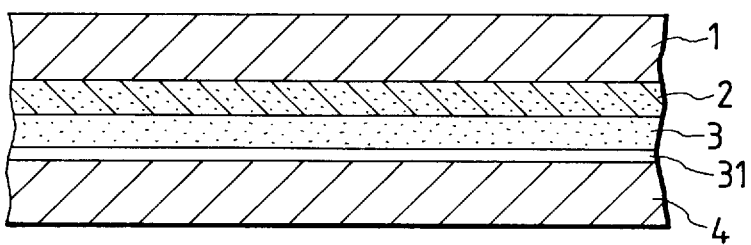
FIG. 3 is a sectional view illustrating a third embodiment of moquette according to the present invention.

FIG. 3 is a sectional view illustrating a third embodiment of the moquette according to the present invention, in which the moquette has a structure in that a super-absorbent-polymer-powder layer 2, a peat-moss-powder layer 3 and a porous plastic film layer 31 in the order from the inside are interposed between a hemp cloth layer (inner wall material) 1 and a jute layer (outer wall material) 4.

FIG. 4 is a sectional view illustrating a state where the moquette according to the present invention is used for a horticultural hanging pot, in which the reference numerals 1 to 4 designate the same ones as mentioned above; 5, a hanging pot; 6, a plant; and M, a moquette. The moquette M is laid in the hanging pot 5 so that the hemp cloth (inner wall material) 1 is disposed inside while the jute layer (outer wall material) 4 is disposed outside as shown in FIG. 4. In addition to laying the moquette M in the hanging pot 5 as shown in FIG. 4, a powder-like super absorbent polymer 7 is mixed into soil so that the water retention can be even more improved.

As has been described, by interposing a super absorbent polymer between moquette layers in the form of a sandwich, the moquette has an effect not only to keep the water retention at the maximum but also to keep the air permeability so as to accelerate the growth of the roots of plants, a function to absorb water while holding the supplied moisture, and an effect to prevent the moisture from leaking to the outside. In such a manner, according to the present invention, a moquette having antithetical functions of air permeability and water retention can be provided, so that it is possible to solve water leakage, and it is possible to relieve a hanging pot from drying, out which has been a disadvantage, on a large scale in comparison with the conventional one. Further, because the inner wall of the moquette consists of hemp cloth, there is another effect in that a slit (cut) can be made easily with scissors or a cutter, and plants can be planted through the slit.

What is claimed is:

1. A hanging pot moquette for a horticultural hanging pots comprising:

a hanging pot-facing, outer wall material made of a jute layer;

an inner wall material made of a hemp cloth layer; and a super-absorbent-polymer-powder layer and a peat-moss-powder layer interposed between said inner wall material and said outer wall material.

2. A hanging pot moquette for a horticultural hanging pot, comprising:

a hanging pot-facing, outer wall material made of a jute layer;

an inner wall material made of a hemp cloth layers; and a super-absorbent-polymer-powder layer and a porous plastic film interposed between said inner wall material and said outer wall material.

3. A hanging pot moquette for a horticultural hanging pot, comprising:

a hanging pot-facing, outer wall material made of a jute layer;

an inner wall material made of a hemp cloth layers; and a super-absorbent-polymer-powder layer, a peat-moss-powder layer and a porous plastic film interposed between said inner wall material and said outer wall material.

* * * * *